US012744280B2

(12) United States Patent
Ikoma et al.

(10) Patent No.: US 12,744,280 B2
(45) Date of Patent: Sep. 22, 2026

(54) METAL-AIR BATTERY

(71) Applicant: Toray Industries, Inc., Tokyo (JP)

(72) Inventors: Kei Ikoma, Otsu (JP); Aya Seita, Otsu (JP); Akimitsu Tsukuda, Otsu (JP)

(73) Assignee: Toray Industries, Inc., Tokyo (JP)

( * ) Notice: Subject to any disclaimer, the term of this patent is extended or adjusted under 35 U.S.C. 154(b) by 533 days.

(21) Appl. No.: 18/551,828

(22) PCT Filed: Mar. 28, 2022

(86) PCT No.: PCT/JP2022/014880
§ 371 (c)(1),
(2) Date: Sep. 21, 2023

(87) PCT Pub. No.: WO2022/210489
PCT Pub. Date: Oct. 6, 2022

(65) Prior Publication Data

US 2024/0213618 A1 Jun. 27, 2024

(30) Foreign Application Priority Data

Mar. 31, 2021 (JP) ................................ 2021-059764

(51) Int. Cl.

| | |
|---|---|
| ***H01M 50/423*** | (2021.01) |
| ***H01M 4/134*** | (2010.01) |
| ***H01M 4/38*** | (2006.01) |
| ***H01M 12/08*** | (2006.01) |
| ***H01M 50/414*** | (2021.01) |
| ***H01M 50/489*** | (2021.01) |
| ***H01M 50/491*** | (2021.01) |
| ***H01M 50/497*** | (2021.01) |

(52) U.S. Cl.
CPC ......... *H01M 50/423* (2021.01); *H01M 4/134* (2013.01); *H01M 4/38* (2013.01); *H01M 4/382* (2013.01); *H01M 12/08* (2013.01); *H01M 50/414* (2021.01); *H01M 50/489* (2021.01); *H01M 50/491* (2021.01); *H01M 50/497* (2021.01); *H01M 2300/0028* (2013.01)

(58) Field of Classification Search
CPC ...... H01M 50/423; H01M 4/134; H01M 4/38; H01M 4/382; H01M 4/414; H01M 4/489; H01M 4/491; H01M 4/497; H01M 12/08; H01M 2300/0028
See application file for complete search history.

(56) References Cited

U.S. PATENT DOCUMENTS

| | | | | |
|---|---|---|---|---|
| 10,892,518 | B2 | 1/2021 | Lee et al. | |
| 2008/0305389 | A1* | 12/2008 | Arora | H01M 6/04 429/145 |
| 2012/0276457 | A1 | 11/2012 | Hirose et al. | |
| 2013/0017432 | A1 | 1/2013 | Roumi | |
| 2014/0227616 | A1 | 8/2014 | Yamada et al. | |
| 2021/0057701 | A1* | 2/2021 | Zhang | H01M 50/403 |

FOREIGN PATENT DOCUMENTS

| | | | | |
|---|---|---|---|---|
| JE | 2003-132963 | A | 5/2003 | |
| JP | 2006-152009 | A | 6/2006 | |
| JP | 2007-302717 | A | 11/2007 | |
| JP | 2010-192313 | A | 9/2010 | |
| JP | 2013-125736 | A | 6/2013 | |
| JP | 2013-127908 | A | 6/2013 | |
| JP | 2013-173862 | A | 9/2013 | |
| JP | 2015-519686 | A | 7/2015 | |
| JP | 2017-191766 | A | 10/2017 | |
| JP | 2020-57596 | A | 4/2020 | |
| KR | 20170099377 | A * | 8/2017 | H01M 2/1686 |
| WO | 2011/089710 | A1 | 7/2011 | |
| WO | 2013/073292 | A1 | 5/2013 | |

OTHER PUBLICATIONS

Machine Translation of KR 20170099377(A) (Year: 2017).*
Metal-air electrochemical cell on Wikipeida (https://en.wikipedia.org/wiki/Metal%E2%80%93air_electrochemical_cell) (Year: 2026).*
Understanding Air Permeability Test Standards—Methods, Equipment, and Results (https://kohantextilejournal.com/understanding-air-permeability-test-standards-methods-equipment-results/) (Year: 2025).*
Machine translation of JP 2013125736A (Hiizaka) (cited on the IDS) (Year: 2013).*
International Search Report dated Jun. 7, 2022, of counterpart International Application No. PCT/JP2022/014880 along with an English translation.

* cited by examiner

*Primary Examiner* — Eugenia Wang
(74) *Attorney, Agent, or Firm* — DLA Piper LLP (US)

(57) ABSTRACT

A secondary metal-air battery includes a positive electrode, a negative electrode, a nonaqueous electrolyte, an aqueous electrolyte, and a separator, in which the positive electrode is an air electrode, the negative electrode includes a negative electrode current collector and a negative electrode mixture layer formed on the negative electrode current collector, the negative electrode mixture layer contains at least one component selected from the group consisting of lithium metal, magnesium, zinc, and aluminum, and the separator is a polymer film having an air permeability of more than 10,000 seconds/100 mL, an ionic conductance of $1\times10^{-5}$ S/cm or more, and a water contact angle of 90° or more.

16 Claims, No Drawings

METAL-AIR BATTERY

TECHNICAL FIELD

This disclosure relates to a secondary battery.

BACKGROUND

In recent years, miniaturization of portable electronic devices has progressed rapidly, and a power source thereof is also required to have a higher energy density. To reduce the weight and increase the energy of batteries, Li metal negative electrodes, all-solid batteries, air batteries and the like have been actively studied. In particular, as the positive electrode evolves into an air electrode using air as an energy source, it becomes possible to achieve an overwhelming weight reduction compared to existing oxide electrodes. Therefore, such a battery has a higher capacity than a lithium secondary battery that is currently widely used and is promising as a next-generation power source. As the air battery, for example, metal-air batteries such as lithium-air batteries, magnesium-air batteries, and zinc-air batteries are known.

Metal-air batteries have many problems in designing positive electrodes, negative electrodes, separators, electrolytic solutions and the like for practical use. There has been a problem with the positive electrode that a solid (a product solid) generated by an electrode reaction accumulates in the air electrode, the air electrode is clogged, contact between the electrolytic solution and air is blocked, and charging and discharging are hindered.

As a technique for solving the problem of precipitation of the product solid, it has been proposed to use an aqueous electrolyte as an electrolyte of a metal-air battery. In a metal-air battery using an aqueous electrolyte, a metal hydroxide is generated as the product solid, and the product solid has water solubility so that the product solid can be dissolved in the aqueous electrolyte, and precipitation of the product solid can be suppressed.

However, a metal-air battery using an aqueous electrolyte has a problem that a product solid is precipitated and the battery is deactivated when the saturated solubility of a salt in the aqueous electrolyte is exceeded, or when lithium metal is used for a negative electrode, it is difficult to put the battery into practical use from the viewpoint of safety.

In addition, also for the negative electrode, there are problems of a decrease in safety and a decrease in life characteristics due to dendrite of various metal negative electrodes.

Therefore, it is important to address the problems of the air battery by using two different types of electrolytes in combination.

As an approach to use two different types of electrolytes in combination, Japanese Patent Laid-open Publication No. 2010-192313 proposes disposition of an aqueous electrolyte on the positive electrode side and an ion conductive glass-ceramic on the negative electrode side to improve battery characteristics. Japanese Patent Laid-open Publication No. 2017-191766 proposes that a negative electrode can be protected by providing a polymer-containing electrolyte coating layer on the surface of a lithium ion conductive solid electrolyte to improve characteristics.

However, Japanese Patent Laid-open Publication No. 2010-192313 uses a glass-ceramic having high strength but poor flexibility, and separability of the aqueous electrolyte upon impact is insufficient. Japanese Patent Laid-open Publication No. 2017-191766 does not use or cannot use an aqueous electrolyte and thus is considered not to contribute to addressing the fundamental problem of the air electrode.

It could therefore be helpful to provide a secondary battery having a high battery capacity and excellent cycle characteristics by using a separator capable of separating a nonaqueous electrolyte and an aqueous electrolyte in a battery using a nonaqueous electrolyte and an aqueous electrolyte.

SUMMARY

We thus provide:

(1) A secondary battery includes a positive electrode, a negative electrode, a nonaqueous electrolyte, an aqueous electrolyte, and a separator, in which the positive electrode is an air electrode, the negative electrode includes a negative electrode current collector and a negative electrode mixture layer formed on the negative electrode current collector, the negative electrode mixture layer contains at least one component selected from the group consisting of lithium metal, magnesium, zinc, and aluminum, and the separator is a polymer film having an air permeability of more than 10,000 seconds/100 mL, an ionic conductance of $1\times10^{-5}$ S/cm or more, and a water contact angle of 90° or more.

(2) The secondary battery according to (1), in which the polymer film has a change ratio of a contact angle after 1 hour of dropwise addition of water to a contact angle after 10 seconds of dropwise addition of water of less than 10%.

(3) The secondary battery according to (1) or (2), in which a contact angle of the polymer film measured using dimethyl carbonate is 90° or more.

(4) The secondary battery according to any one of (1) to (3), in which the polymer film has a change ratio of a contact angle after 1 hour of dropwise addition of dimethyl carbonate to a contact angle after 10 seconds of dropwise addition of dimethyl carbonate of less than 10%.

(5) The secondary battery according to any one of (1) to (4), in which the polymer film has a meltdown temperature of 300° C. or higher.

(6) The secondary battery according to any one of (1) to (5), in which a polymer constituting the polymer film contains an aromatic polyamide, an aromatic polyimide, or an aromatic polyamideimide.

It is thus possible to provide a secondary battery having a high battery capacity and excellent cycle characteristics.

DETAILED DESCRIPTION

A secondary battery according to an example will be described below in detail.

The secondary battery includes a positive electrode, a negative electrode, a nonaqueous electrolyte, an aqueous electrolyte, and a separator, in which the positive electrode is an air electrode, the negative electrode includes a negative electrode current collector and a negative electrode mixture layer formed on the negative electrode current collector, the negative electrode mixture layer contains at least one component selected from the group consisting of lithium metal, magnesium, zinc, and aluminum, and the separator is a polymer film having an air permeability of more than 10,000 seconds/100 mL, an ionic conductance of $1\times10^{-5}$ S/cm or more, and a water contact angle of 90° or more. In the present invention, the term 'secondary battery' refers to a metal-air battery in which the positive electrode is an air electrode and the negative electrode is a current collector containing a metal.

Positive Electrode

In the example, the electrode used for the positive electrode is an air electrode using air as an energy source. The air electrode has, for example, a configuration in which an oxygen reduction catalyst such as platinum is supported on a porous carbon sheet or a sheet configuration of carbon having high catalytic activity such as graphene and carbon nanotubes. The porous carbon sheet is, for example, carbon paper, carbon black, or an acetylene black sheet.

Negative Electrode

The negative electrode includes the negative electrode current collector and the negative electrode mixture layer formed on the negative electrode current collector. As the negative electrode current collector, for example, a negative electrode current collector made of copper, nickel, or stainless steel can be used.

In the example, a negative electrode active material contained in the negative electrode mixture layer contains at least one component selected from the group consisting of lithium metal, magnesium, zinc, and aluminum. Among them, lithium metal is preferably used from the viewpoint of the operating voltage of the battery and the theoretical capacity of the negative electrode active material.

The negative electrode is produced, for example, as follows. In lithium metal, production can be performed by forming lithium nanoparticles and spraying the lithium nanoparticles together with He gas to deposit the lithium nanoparticles on a negative electrode current collector by the gas deposition method.

Electrolyte

As the electrolyte used in the example, a nonaqueous electrolyte and an aqueous electrolyte are used. The nonaqueous electrolyte includes an organic solvent and a solute.

As the organic solvent of the nonaqueous electrolyte, cyclic esters, chain esters, cyclic ethers, chain ethers, amides and the like are used and, specifically, organic solvents such as ethylene carbonate (EC), propylene carbonate (PC), butylene carbonate (BC), vinylene carbonate (VC), dimethyl carbonate (DMC), diethyl carbonate (DEC), methyl ethyl carbonate (MEC), γ-butyrolactone (γBL), 2-methyl-γ-butyrolactone, acetyl-γ-butyrolactone, γ-valerolactone, 1,2-dimethoxyethane (DME), 1,2-ethoxyethane, diethyl ether, ethylene glycol dialkyl ethers, diethylene glycol dialkyl ethers, triethylene glycol dialkyl ethers, tetraethylene glycol dialkyl ethers, dipropyl carbonate, methyl butyl carbonate, methyl propyl carbonate, ethyl butyl carbonate, ethyl propyl carbonate, butyl propyl carbonate, propionic acid alkyl esters, malonic acid dialkyl esters, acetic acid alkyl esters, tetrahydrofuran (THF), alkyltetrahydrofurans, dialkylalkyltetrahydrofurans, alkoxytetrahydrofurans, dialkoxytetrahydrofurans, 1,3-dioxolane, alkyl-1,3-dioxolanes, 1,4-dioxolane, 2-methyltetrahydrofuran, dimethyl sulfoxide, 1,3-dioxolane, formamide, dimethylformamide, dioxolane, acetonitrile, nitromethane, methyl formate, methyl acetate, methyl propionate, ethyl propionate, phosphoric acid triesters, and N-methyl-2-pyrrolidone and derivatives and mixtures thereof are preferably used.

As the solute contained in the nonaqueous electrolyte, a halide, a perchlorate, a thiocyanate, a borofluoride, a phosphofluoride, an arsenofluoride, an aluminofluoride, a trifluoromethylsulfate and the like of an alkali metal, particularly lithium, are preferably used. For example, one or more salts such as lithium salts (solutes) such as lithium0 perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethasulfonate ($LiCF_3SO_3$), and lithium bis(trifluoromethyl) sulfonylimide [$LiN(CF_3SO_2)_2$] can be used, but lithium hexafluorophosphate is preferable from the viewpoint of oxidation resistance and reduction resistance.

The amount of the solute dissolved in the organic solvent is preferably 0.5 to 3.0 mol/L, particularly preferably 0.8 to 1.5 mol/L.

Additives may be used for the nonaqueous electrolyte as necessary. Examples of the additive include vinylene carbonate, fluoroethylene carbonate, ethylene sulfite, 1,4-butane sultone, propane sultone, 2,4-difluoroanisole, biphenyl, and cyclohexylbenzene, and one or more of these may be used.

Examples of the aqueous electrolyte include an acidic electrolytic solution and an alkaline electrolytic solution. Examples of the acidic electrolytic solution include hydrochloric acid, sulfuric acid, and hydrofluoric acid. Examples of the alkaline electrolytic solution include an aqueous potassium hydroxide solution, calcium hydroxide, an aqueous sodium hydroxide solution, and lithium hydroxide.

In addition, in the viewpoint of the safety and life characteristics of the battery and stable operation of the battery, the electrolytic solution in the secondary battery is preferably the aqueous electrolyte on the positive electrode side and the nonaqueous electrolyte on the negative electrode side.

Separator

The separator is a polymer film having an air permeability of more than 10,000 seconds/100 mL, an ionic conductance of $1\times10^{-5}$ S/cm or more, and a water contact angle of 90° or more.

The separator has an air permeability of more than 10,000 seconds/100 mL since it is necessary to separate the electrolytic solutions in a battery using two electrolytic solutions of the nonaqueous electrolyte and the aqueous electrolyte. When the air permeability is more than 10,000 seconds/100 mL, the separator can be regarded as a nonporous structure substantially having no continuous hole.

It is important that the separator is a polymer film having a water contact angle of 90° or more because it is necessary that the separator does not swell with the electrolytic solutions and does not allow the aqueous electrolyte to permeate therethrough. When the water contact angle is less than 90%, the aqueous electrolyte may permeate through the separator and be mixed with the nonaqueous electrolyte, resulting in deterioration of battery characteristics. In addition, from the viewpoint that the electrolytic solutions can be separated at the time of using the battery and the battery characteristics, the change ratio of the separator of the contact angle after 1 hour of dropwise addition of water to the contact angle after 10 seconds of dropwise addition of water is preferably less than 10%, more preferably less than 7%.

In addition, since it is necessary that the separator does not swell even in the nonaqueous electrolyte and does not allow the nonaqueous electrolyte to permeate, the separator is preferably a polymer film having a contact angle measured using dimethyl carbonate of 90° or more. In addition, from the viewpoint of being able to separate the electrolytic solutions at the time of using the battery and the battery characteristics, the change ratio of the separator of the contact angle after 1 hour of dropwise addition of dimethyl carbonate to the contact angle after 10 seconds of dropwise addition of dimethyl carbonate is preferably less than 10%, more preferably less than 7%.

Since the separator has a nonporous structure, the separator cannot be impregnated with the electrolytic solutions and does not swell with the electrolytic solutions, it is important from the viewpoint of battery characteristics that the polymer film has ion conductivity. It is important that the ionic conductance, which is an index of the ionic conductivity of the separator, is $1\times10^{-5}$ S/cm or more. When the ionic conductance is less than $1\times10^{-5}$ S/cm, the resistance is high, and the battery characteristics may be deteriorated.

From the viewpoint of battery safety, the meltdown temperature of the separator is preferably 300° C. or higher, more preferably 350° C. or higher.

A polymer film that achieves the separator will be described in detail.

As a polymer constituting the polymer film, which is the separator, a polymer having an aromatic ring on the main chain is suitable as a polymer having all of heat resistance, strength, and flexibility. Examples of such a polymer include aromatic polyamides (aramids), aromatic polyimides, aromatic polyamide-imides, aromatic polyether ketones, aromatic polyether ether ketones, aromatic polyarylates, aromatic polysulfones, aromatic polyethersulfones, aromatic polyetherimides, and aromatic polycarbonates. In addition, it may be a blend of a plurality of polymers. Among them, it is preferable that 30 to 100 mass % of an aromatic polyamide, an aromatic polyimide, or an aromatic polyamide-imide be contained when the mass of the entire film is 100% because such a polymer is excellent in heat resistance and easily maintains high strength when the film is thinned. More preferably, it is 50 to 100 mass % or more.

The polymer that can be suitably used preferably contains a polymer having a structure of any one of Chemical Formulas (I) to (III) in the polymer constituting the film, and examples of the aromatic polyamide include those having a repeating unit represented by Chemical Formula (I), examples of the aromatic polyimide include those having a repeating unit represented by Chemical Formula (II), and examples of the aromatic polyamide-imide include those having a repeating unit represented by Chemical Formula (III).

Chemical Formula (I):

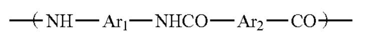

(I)

Chemical Formula (II):

(II)

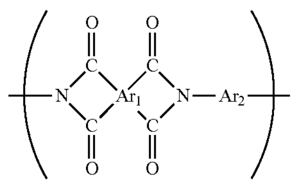

Chemical Formula (III):

(III)

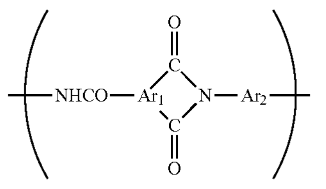

$Ar_1$ and/or $Ar_2$ in Chemical Formulas (I) to (III) are aromatic groups, each of which may be a single group or a copolymer of a plurality of groups and multiple components. The bonds constituting the main chain on the aromatic ring may be either meta-orientation or para-orientation. Furthermore, some of the hydrogen atoms on the aromatic ring may be substituted with an arbitrary group.

Examples of means for achieving both separation of the electrolytic solutions and heat resistance and excellent ion conductivity include a method of transporting ions by hopping by controlling the polarity of the polymer.

When an aromatic polyamide, an aromatic polyimide, or an aromatic polyamide-imide is used, since a carbonyl group is included in the structure, this group generally often becomes a site having high affinity with lithium ions. Therefore, since a site having lower affinity with lithium ions than a carbonyl group is required for lithium ions to move in the polymer film, it is preferable to have an ether bond or a thioether bond in the main chain or the side chain (in the main chain or on the side chain). More preferably, an ether bond is preferably included in the main chain, or at least one group of a carboxylic acid group, a carboxylate salt group, a sulfonic acid group, a sulfonate salt group, an alkoxy group, and a cyanate group is preferably included in the substituent on the aromatic ring. More preferably, 25 to 100 mol % of the total of all groups of $Ar_1$ and $Ar_2$ in Chemical Formulas (I) to (III) is at least one group selected from the groups represented by Chemical Formulas (IV) to (VI), and the above ratio is more preferably 50 to 100 mol %.

Chemical Formulas (IV) to (VI)

(IV)

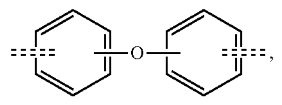

(V)

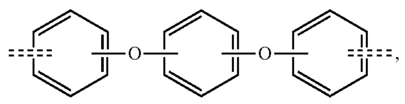

(VI)

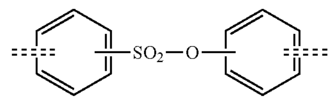

The double dashed lines in Chemical Formulas (IV) to (VI) represent one or two bonds.

Where a part of hydrogen atoms on the aromatic rings of Chemical Formulas (IV) to (VI) may be substituted with any group such as a halogen group such as fluorine, bromine, and chlorine; a nitro group; a cyano group; an alkyl group such as methyl, ethyl, and propyl; an alkoxy group such as methoxy, ethoxy, and propoxy, or a carboxylic acid group.

In addition, it is preferable to add a lithium salt to facilitate ion conduction in the polymer film, and it is more preferable to add a lithium salt having high dissociability of lithium ions having a large anion radius to further improve ion conductivity. As the lithium salt to be added, the same lithium salt as the solute contained in the electrolytic solution can be used. Among them, lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethasulfonate ($LiCF_3SO_3$), and lithium bis(trifluoromethyl) sulfonylimide [$LiN(CF_3SO_2)_2$] are preferable, and lithium trifluoromethasulfonate ($LiCF_3SO_3$) and lithium bis(trifluoromethyl) sulfonylimide [$LiN(CF_3SO_2)_2$] are preferably added from the viewpoint of the anion radius and the dissociability of lithium ions. More preferably, addition of lithium bis(trifluoromethyl) sulfonylimide [$LiN(CF_3SO_2)_2$] having a large anion radius is preferable.

Next, a method of producing a polymer film as a separator will be described below.

Synthesis of Polymer

First, a method of obtaining a polymer that can be used for the polymer film will be described by taking an aromatic polyamide and an aromatic polyimide as examples. Of course, the polymer that can be used and the polymerization method thereof are not limited thereto.

Various methods can be used as a method of obtaining an aromatic polyamide. For example, when the low-temperature solution polymerization method is used using an acid dichloride and a diamine as raw materials, the aromatic polyamide is synthesized in an aprotic organic polar solvent such as N-methylpyrrolidone, N,N-dimethylacetamide, dimethylformamide, and dimethylsulfoxide. In solution polymerization, to obtain a polymer having a high molecular weight, the moisture content in the solvent used for polymerization is preferably 500 ppm or less (by mass, the same applies hereinafter), more preferably 200 ppm or less.

When a polyamic acid as an aromatic polyimide or a precursor thereof is polymerized using, for example, a tetracarboxylic anhydride and an aromatic diamine as raw materials, a synthesis method by solution polymerization in an aprotic organic polar solvent such as N-methyl-2-pyrrolidone, N,N-dimethylacetamide, dimethylformamide, and dimethylsulfoxide can be employed. When both the tetracarboxylic anhydride and the aromatic diamine as raw materials are used in equal amounts, an ultrahigh molecular weight polymer may be produced, and therefore it is preferable to adjust the molar ratio so that one is 90.0 to 99.5 mol % of the other.

The inherent viscosities (ηinh) of the aromatic polyamide and the aromatic polyimide or the polyamic acid, which is a precursor thereof, are preferably 0.5 to 6.0 dl/g, more preferably 3.0 to 6.0 dl/g. When the inherent viscosity is less than 0.5 dl/g, the interchain bonding force due to entanglement of polymer molecular chains is reduced so that mechanical properties such as toughness and strength may be deteriorated or the thermal shrinkage ratio may be increased. If the inherent viscosity exceeds 6.0 dl/g, the ion permeability may decrease.

Preparation of Film-Forming Raw Material

Next, the film-forming raw solution used in the process of producing the polymer film (a film-forming raw solution) will be described.

For the film-forming raw solution, the polymer solution after polymerization may be used as it is, or the polymer may be isolated once and then redissolved in the above-described aprotic organic polar solvent or inorganic solvent such as sulfuric acid.

The concentration of the polymer in the film-forming raw solution is preferably 3 to 30 mass %, more preferably 5 to 20 mass %. The lithium salt described above is preferably added to the film-forming raw solution from the viewpoint of improving ion conductivity. The molar ratio of lithium in the lithium salt to oxygen in the polymer is preferably 0.1 or more, more preferably 0.2 or more as the added amount of the lithium salt.

Formation of Polymer Film

Next, a method of forming the polymer film will be described. The film-forming raw solution prepared as described above can be formed into a film by what is called solvent casting. The solvent casting includes a dry-wet method, a dry method, a wet method and the like, and film formation may be performed by any method, but here, the dry-wet method will be described as an example. The polymer film may be formed directly on a substrate having pores or on an electrode to form a laminated composite, but here, a method of forming a film as an independent film will be described.

In film formation by a dry-wet method, a film-forming raw solution is extruded from a spinneret onto a support such as a drum, an endless belt, and a film to form a film-shaped product, and then the film-shaped product is dried until the film-shaped product has self-holding properties. The drying condition can be performed, for example, at 60 to 220° C. within 60 minutes. However, when a polyamic acid polymer is used and it is desired to obtain a film made of an aromatic polyamic acid without imidization, the drying temperature is preferably 60 to 150° C., more preferably 60 to 120° C. The film after the dry process is peeled from the support and introduced into the wet process, desalted, desolventized and the like, and further stretched, dried, and heat-treated. The stretch ratio in the stretching is preferably 0.8 to 8.0 in terms of the plane ratio (the plane ratio is defined as a value obtained by dividing the area of the film after stretching by the area of the film before stretching). A value of 1 or less means relaxation, more preferably 1.0 to 5.0. As the heat treatment, heat treatment is performed at a temperature of 80° C. to 500° C., preferably 150° C. to 400° C., for several seconds to several tens of minutes. However, when a polyamic acid polymer is used and it is desired to obtain a film made of a polyamic acid without imidization, the heat treatment temperature is preferably 80 to 150° C. More preferably, the temperature is set to 80 to 120° C. under reduced pressure.

Secondary Battery

Examples of the form of the air battery of the example include a form of a coin battery, a laminated battery or the like. As a method of producing an air battery, for example, in a laminated battery or a coin battery, a positive electrode sheet, a separator, a negative electrode sheet, and a separator having predetermined sizes are laminated in this order to produce a laminate, the produced wound body or laminate is filled in each battery case, lead bodies of the positive electrode and the negative electrode are welded, then an electrolytic solution is injected into the battery case, and an opening of the battery case is sealed to complete the battery case.

EXAMPLES

Hereinafter, our batteries and methods will be described in detail by way of examples, but this disclosure is not limited to the examples. The measurement methods used in examples will be shown below.

Measurement Methods (1) Meltdown Temperature of Separator

A separator having a size of 50 mm×50 mm was cut out, and the sample was sandwiched between two stainless steel plates each having a through hole measuring 12 mm at the center and further sandwiched between heating block plates each having a through hole measuring 12 mm at the center from both sides of the sample. A sphere made of tungsten carbide and having a diameter of 9.5 mm was placed in the through hole, the temperature of the heating blocks was raised at 5° C./min, and the temperature when the sphere dropped was measured. The test was performed five times, and the average value was taken as the meltdown temperature (° C.).

(2) Air Permeability of Separator

The air permeability was measured in accordance with JIS P 8117 (1998) using an Oken air resistance meter (manufactured by Asahi Seiko Co., Ltd, EGO-1T).

The measurement limit of the air permeability is 10,000 seconds/100 mL, and the separator has a substantially non-porous structure.

(3) Ionic Conductance (Unit: S/Cm)

The polymer film was immersed in an electrolytic solution (1M LiTFSI ethylene carbonate (EC)/diethyl carbonate (DEC)=1/1, manufactured by Mitsui Chemicals, Inc.) for 24 hours and then placed on an SUS 304 electrode to cover an electrode portion, the electrolytic solution was dropped, and then the product was sandwiched with another SUS electrode to produce a laminate of electrode/polymer film/electrode. An evaluation cell was prepared by fixing the laminate with a silicon plate so that the laminate will not be displaced.

For the produced cell, the AC impedance was measured under the conditions of an amplitude of 10 mV and frequencies of 1 MHz to 10 mHz with an electrochemical tester (manufactured by Biologic, model number: SP-150) at 25° C., the resistance value was read from the graph plotted on a complex plane, and the resistance value was substituted into the following equation to calculate the ionic conductance. Measurements were made five times, and the calculated average value was taken as the ionic conductance.

$\sigma = d1/AR$ $\sigma$: Ionic conductance (S/cm)

d1: Thickness (cm) of polymer film (before immersion in electrolytic solution)

A: Area of electrode ($cm^2$)

R: Resistance value ($\Omega$)

(4) Water Contact Angle of Separator and Change Ratio Thereof

First, the separator is allowed to stand in an atmosphere at a room temperature of 23° C. and a relative humidity of 65% for 24 hours. Thereafter, under the same atmosphere, the contact angle of the separator after 10 seconds of dropwise addition of water is measured at 5 points with a contact angle meter Drop Master DM-501 manufactured by Kyowa Interface Science Co., Ltd. The average of the measured values at three out of five points excluding the maximum and minimum values was used as the water contact angle.

In addition, the contact angle after 1 hour of dropwise addition was measured in the same manner, and the change ratio from the contact angle after 10 seconds of dropwise addition was evaluated using equation (1).

$$(1-(\text{contact angle after 1 hour of dropwise addition})/(\text{contact angle after 10 seconds of dropwise addition}))\times 100 \quad (1)$$

(5) Contact Angle of Separator Measured Using Dimethyl Carbonate and Change Ratio Thereof First, the separator is allowed to stand in an atmosphere at a room temperature of 23° C. and a relative humidity of 65% for 24 hours. Thereafter, under the same atmosphere, the contact angle of the separator after 10 seconds of dropwise addition of dimethyl carbonate is measured at 5 points with a contact angle meter Drop Master DM-501 manufactured by Kyowa Interface Science Co., Ltd. The average of the measured values at three out of five points excluding the maximum and minimum values was used as the contact angle measured using dimethyl carbonate.

In addition, the contact angle after 1 hour of dropwise addition was measured in the same manner, and the change ratio from the contact angle after 10 seconds of dropwise addition was evaluated using equation (2).

$$(\text{Contact angle after 1 hour of dropwise addition})/(\text{contact angle after 10 seconds of dropwise addition})\times 100-100 \quad (2)$$

(6) Inherent Viscosity of Polymer (Unit: dl/g)

A polymer was dissolved at a concentration of 0.5 g/dl in N-methylpyrrolidone (NMP) containing 2.5 wt % of lithium bromide (LiBr), and the flow time was measured at 30° C. using an Ubbelohde viscometer. The flow time of a blank LiBr 2.5 wt %/NMP in which the polymer was not dissolved was also measured in the same manner, and the viscosity $\eta$ (dl/g) was calculated using equation (3).

$$\eta=[\ln(t/t0)]/0.5 \quad (3)$$

t0: Flow time of blank(S)

t: Flow time of sample(S)

(7) Charge/Discharge Cycle Characteristics

For the secondary battery produced in each of examples and comparative examples, the charge/discharge cycle characteristics were tested according to the following procedure, and the discharge capacity retention rate was calculated.

1st to 30th Cycles

Charge and discharge were repeated 150 times at 25° C. with charge and discharge being 1 cycle in which constant current charge was performed under charging conditions of 0.1 C and 5 V and constant current discharge was performed under discharging conditions of 0.1 C and 2.8 V.

Calculation of Discharge Capacity Retention Rate

The discharge capacity retention rate was calculated from (discharge capacity in 30th cycle)/(discharge capacity in 1st cycle)×100. Five secondary batteries produced in each of the examples and comparative examples were subjected to a test, and an average of three measurement results excluding the results showing the maximum and minimum discharge capacity retention rates was taken as the discharge capacity retention rate. When the discharge capacity retention rate was less than 60% was rated as C (unacceptable), when the discharge capacity retention rate was 60% or more and less than 70% was rated as B (acceptable), when the discharge capacity retention rate was 70% or more and less than 75% was rated as A (good), and when the discharge capacity retention rate was 75% or more was rated as S (excellent). In addition, when the battery cannot be operated, it is indicated as—.

Example 1

A separator and a secondary battery were produced as follows. The physical properties of the separator and the characteristics of the secondary battery are shown in Table 1.

Positive Electrode

An air electrode in which 20% of a platinum catalyst was supported on carbon paper was used.

Negative Electrode

A commercially available lithium metal foil (manufactured by Honjo Metal Co., Ltd.) was used.

Electrolytic Solution

The nonaqueous electrolyte was prepared as follows. In 1 L of a mixed solvent of ethylene carbonate (EC) and diethyl carbonate (DEC) at a volume ratio of 1:1, 1.0 mol of lithium hexafluorophosphate ($LiPF_6$) was dissolved to prepare a mixed solution, and 2 parts by mass of vinylene carbonate (VC) was further added to 100 parts by mass of the mixed solution to prepare a nonaqueous electrolyte.

The aqueous electrolyte was prepared as follows. In pure water, 1 mol % of potassium hydroxide (KOH) was dissolved to prepare a mixed solution, thereby preparing an aqueous electrolyte.

Separator 4,4'-Diaminodiphenyl ether as a diamine was dissolved in dehydrated N-methyl-2-pyrrolidone under a nitrogen stream, and the solution was cooled to 30° C. or lower. Under a nitrogen stream, 2-chloroterephthaloyl chloride corresponding to 99 mol % based on the total amount of the diamine was added thereto over 30 minutes while the inside of the system was kept at 30° C. or lower, and after the total amount was added, stirring was performed for about 2 hours to polymerize the aromatic polyamide. The obtained polymerization solution was neutralized with 97 mol % of lithium carbonate and 6 mol % of diethanolamine based on the total amount of the acid chloride to provide a polymer solution A. The obtained polymer had an inherent viscosity $\eta$ of 2.5 dl/g.

Lithium bis(trifluoromethyl) sulfonylimide [$LiN(CF_3SO_2)_2$] as a lithium salt was added to the resulting polymer solution so that the molar ratio of lithium in the lithium salt and oxygen in the polymer was 0.2, and the solution was stirred and defoamed using a mixer (manufactured by Thinky Corporation, model number: AR-250) to provide a homogeneous transparent solution. The obtained homogeneous mixed solution of the polymer and the lithium salt was applied in the form of a film on a glass plate as a support and dried at a hot air temperature of 60° C. until the polymer film had self-supporting properties, and then the polymer film was peeled off from the support. Subsequently, the product was introduced into a water bath at 25° C. to extract the solvent, a neutralized salt and the like. Subsequently, water on the surface of the obtained polymer film containing water was wiped off, and then heat treatment was performed for 1 minute in a tenter chamber at a temperature of 180° C. to provide a polymer film having a thickness of 5 μm.

Assembly of Battery

In a dry atmosphere, the positive electrode and the negative electrode were disposed in a two-compartment cell (SB-100B manufactured by EC Frontier Co., Ltd) together with the separator, the aqueous electrolyte was injected to the positive electrode side, and the nonaqueous electrolyte was injected to the negative electrode side to produce a secondary battery having a battery capacity of 3 mAh. Oxygen to be supplied to the air electrode was supplied to the air electrode by attaching a simple oxygen cylinder and supplying oxygen to the aqueous electrolyte.

Example 2

A secondary battery was produced in the same manner as in Example 1 except that the aqueous electrolyte was changed to 1-mol % hydrochloric acid.

Example 3

A secondary battery was produced in the same manner as in Example 1 except that lithium bis(trifluoromethyl) sulfonylimide [$LiN(CF_3SO_2)_2$] as a lithium salt was added so that the molar ratio between lithium in the lithium salt to oxygen in the polymer was 0.1 in the production of the separator.

Example 4

In the production of the separator, 4,4'-diaminodiphenyl ether as a diamine was dissolved in dehydrated N-methyl-2-pyrrolidone under a nitrogen stream, and the solution was cooled to 30° C. or lower. Under a nitrogen stream, 2-chloroterephthaloyl chloride corresponding to 99.5 mol % based on the total amount of the diamine was added thereto over 30 minutes while the inside of the system was kept at 30° C. or lower, and after the total amount was added, stirring was performed for about 2 hours to polymerize the aromatic polyamide. The obtained polymerization solution was neutralized with 97 mol % of lithium carbonate and 6 mol % of diethanolamine based on the total amount of the acid chloride to provide a polymer solution B. The obtained polymer had an inherent viscosity n of 3.5 dl/g. A secondary battery was produced in the same manner as in Example 1 except that the obtained polymer solution B was used.

Example 5

A secondary battery was produced in the same manner as in Example 1 except that the lithium salt was changed to lithium trifluoromethasulfonate ($LiCF_3SO_3$) in the production of the separator.

Example 6

A secondary battery was produced in the same manner as in Example 1 except that 1.0 mol of lithium hexafluorophosphate ($LiPF_6$) was dissolved in 1,2-dimethoxyethane (DME) to produce a mixed solution, and 2 parts by mass of vinylene carbonate (VC) was further added to 100 parts by mass of the mixed solution to prepare a nonaqueous electrolyte.

Comparative Example 1

A secondary battery was produced in the same manner as in Example 1 except that both the electrolytic solution on the positive electrode side and the electrolytic solution on the negative electrode side were changed to a nonaqueous electrolyte.

Comparative Example 2

A secondary battery was produced in the same manner as in Example 1 except that both the electrolytic solution on the positive electrode side and the electrolytic solution on the negative electrode side were changed to an aqueous electrolyte, but lithium metal and the aqueous electrolyte reacted with each other so that the secondary battery did not function as a battery.

Comparative Example 3

A secondary battery was produced in the same manner as in Example 1 except that the separator was changed to a cellulose nonwoven fabric (thickness: 40 μm, density: 0.40 g/cm$^3$). The nonwoven fabric was produced with a Fourdrinier machine using 100 mass % of lyocell fibers, which are regenerated cellulose fibers.

Comparative Example 4

A secondary battery was produced in the same manner as in Example 3 except that a change was made such that a polymer solution containing no lithium salt was used alone in the production of the separator.

TABLE 1

| | Air permeability (sec/100 mL) | Ionic conductance (S/cm) | Contact angle Water (°) | Contact angle Dimethyl carbonate (°) | Change ratio of contact angle Water (%) | Change ratio of contact angle Dimethyl carbonate (%) | Meltdown temperature (° C.) | Cycle characteristic — |
|---|---|---|---|---|---|---|---|---|
| Example 1 | >10000 | $2 \times 10^{-5}$ | 115 | 110 | 2 | 2 | 430 | S |
| Example 2 | >10000 | $2 \times 10^{-5}$ | 115 | 110 | 2 | 2 | 430 | A |
| Example 3 | >10000 | $1 \times 10^{-5}$ | 125 | 120 | 1.5 | 1.5 | 435 | B |
| Example 4 | >10000 | $1.8 \times 10^{-5}$ | 120 | 115 | 1.5 | 1.5 | 440 | A |
| Example 5 | >10000 | $1.5 \times 10^{-5}$ | 120 | 110 | 2 | 2 | 425 | B |
| Example 6 | >10000 | $2 \times 10^{-5}$ | 115 | 110 | 2 | 2 | 430 | S |
| Comparative Example 1 | >10000 | $2 \times 10^{-5}$ | 115 | 110 | 2 | 2 | 430 | C |
| Comparative Example 2 | >10000 | $2 \times 10^{-5}$ | 115 | 110 | 2 | 2 | 430 | — |
| Comparative Example 3 | 10 | $9 \times 10^{-4}$ | 50 | 45 | 40 | 45 | 180 | C |
| Comparative Example 4 | >10000 | $1 \times 10^{-9}$ | 115 | 110 | 1 | 1 | 435 | C |

Table 1 shows that Examples 1, 2, 3, 4, and 5 contained a nonaqueous electrolyte and an aqueous electrolyte, the water contact angle in the physical properties of the separator was 90° or more, which had the desired effect, and the secondary battery exhibited good cycle characteristics.

On the other hand, in Comparative Examples 1, 2, 3, and 4, the water contact angle in the physical properties of the separator was less than 90°, which was out of our range, or the solvent composition of the electrolytic solution was of a single type, and the cycle characteristics of the secondary battery were not sufficient.

The invention claimed is:

1. A secondary metal-air battery comprising:

a positive electrode;

a negative electrode;

a nonaqueous electrolyte;

an aqueous electrolyte; and a separator, wherein the positive electrode is an air electrode, the negative electrode includes a negative electrode current collector and a negative electrode mixture layer formed on the negative electrode current collector, the negative electrode mixture layer contains at least one component selected from the group consisting of lithium metal, magnesium, zinc, and aluminum, and the separator is a polymer film having an air permeability of more than 10,000 seconds/100 mL, an ionic conductance of $1 \times 10^{-5}$ S/cm or more, and a water contact angle of 90° or more.

2. The secondary metal-air battery according to claim 1, wherein the polymer film has a change ratio of a contact angle after 1 hour of dropwise addition of water to a contact angle after 10 seconds of dropwise addition of water of less than 10%.

3. The secondary metal-air battery according to claim 2, wherein a contact angle of the polymer film measured using dimethyl carbonate is 90° or more.

4. The secondary metal-air battery according to claim 2, wherein the polymer film has a change ratio of a contact angle after 1 hour of dropwise addition of dimethyl carbonate to a contact angle after 10 seconds of dropwise addition of dimethyl carbonate of less than 10%.

5. The secondary metal-air battery according to claim 2, wherein the polymer film has a meltdown temperature of 300° C. or higher.

6. The secondary metal-air battery according to claim 2, wherein a polymer constituting the polymer film contains an aromatic polyamide, an aromatic polyimide, or an aromatic polyamideimide.

7. The secondary metal-air battery according to claim 1, wherein a contact angle of the polymer film measured using dimethyl carbonate is 90° or more.

8. The secondary metal-air battery according to claim 7, wherein the polymer film has a change ratio of a contact angle after 1 hour of dropwise addition of dimethyl carbonate to a contact angle after 10 seconds of dropwise addition of dimethyl carbonate of less than 10%.

9. The secondary metal-air battery according to claim 7, wherein the polymer film has a meltdown temperature of 300° C. or higher.

10. The secondary metal-air battery according to claim 7, wherein a polymer constituting the polymer film contains an aromatic polyamide, an aromatic polyimide, or an aromatic polyamideimide.

11. The secondary metal-air battery according to claim 1, wherein the polymer film has a change ratio of a contact angle after 1 hour of dropwise addition of dimethyl carbonate to a contact angle after 10 seconds of dropwise addition of dimethyl carbonate of less than 10%.

12. The secondary metal-air battery according to claim 11, wherein the polymer film has a meltdown temperature of 300° C. or higher.

13. The secondary metal-air battery according to claim 11, wherein a polymer constituting the polymer film contains an aromatic polyamide, an aromatic polyimide, or an aromatic polyamideimide.

14. The secondary metal-air battery according to claim 1, wherein the polymer film has a meltdown temperature of 300° C. or higher.

15. The secondary metal-air battery according to claim 14, wherein a polymer constituting the polymer film contains an aromatic polyamide, an aromatic polyimide, or an aromatic polyamideimide.

16. The secondary metal-air battery according to claim 1, wherein a polymer constituting the polymer film contains an aromatic polyamide, an aromatic polyimide, or an aromatic polyamideimide.

* * * * *